United States Patent [19]

Holl

[11] Patent Number: 4,498,768

[45] Date of Patent: Feb. 12, 1985

[54] ANGLE OF ARRIVAL METER

[75] Inventor: Herbert B. Holl, Huntsville, Ala.

[73] Assignee: The United States of America as represented by the Secretary of the Army, Washington, D.C.

[21] Appl. No.: 349,128

[22] Filed: Feb. 16, 1982

[51] Int. Cl.³ .............................................. G01B 11/26
[52] U.S. Cl. .................................... 356/141; 356/152; 250/203 R; 250/216
[58] Field of Search .............................. 356/141, 152; 250/203 R, 204 R, 216

[56] References Cited

U.S. PATENT DOCUMENTS 3,137,794  6/1964  Seward ................................ 250/216
3,478,219 11/1969  Nutz .................................. 250/203 R Primary Examiner—S. C. Buczinski
Attorney, Agent, or Firm—Anthony T. Lane; Robert P. Gibson; Harold W. Hilton

[57] ABSTRACT

Apparatus for instantaneously measuring the horizontal and vertical aspect angles of radiation received from a remote laser transmitter. A triangular corner reflector serves as the receiver of radiation and detectors are provided along the three edges of the reflector. From the number of detectors activated on each side of the reflector, the direction of radiation from UV to millimeter wave length is determined.

6 Claims, 7 Drawing Figures

ANGLE OF ARRIVAL METER

DEDICATORY CLAUSE

The invention described herein may be manufactured, used, and licensed by or for the Government for governmental purposes without the payment to me of any royalties thereon.

BACKGROUND OF THE INVENTION

Various military organizations, in recent years, have been interested in laser locator systems. One such system has been designed to warn armored vehicle crews when they are being designated by a 1.06 micrometer laser designater or rangefinder. The system indicates which quadrant the threat is in and a narrow view detector indicates when the vehicle's main tube is within a few degrees of the target. At this point, the threat can be found by using the vehicle's night sight and appropriate countermeasure can be initiated. Another proposed system utilizes interferometry to detect the presence of a laser beam, its wavelength and its angle of incidence.

The device of the present invention utilizes a triangular cube corner reflector equipped with three detector arrays and electronic processor. The device operates when a bundle of parallel light rays (cw or pulse) illuminates the entire corner entrance aperture. The usefulness of the invention can be divided into two areas of application: Case A, where it determines the location of remote laser rediation (i.e., angle of arrival meter), and case B, where the spatial orientation of a moving object is to be determined, (i.e., guidance system applications).

Case A. The position of the corner has to be known, or can serve as the reference. When the plane of the aperture is vertical, the horizontal and vertical aspect angles of the laser source can be determined, with this data a rangefinder can be employed, to measure the location of the transmitter. This device can be operated either as an airborne or ground based system. It will serve the following purposes:
  (a) Position finding (Distance, horizontal and vertical aspect angles).
  (b) Warning system. With the position information of (a), the following actions may occur:
    (1) evasion,
    (2) screen the threatened position with smoke in the line-of-sight,
    (3) start counter measures such as gunfire, to disable or destroy the illumination source.

Case B. For the position determination of moving objects at remote distances, on the ground or in the air, the direction of the received laser beam, and its length, will be the reference. The corner will be mounted on the object exposed to the laser beam. Then the position of the corner can be measured, and the data can be processed by ground equipment or by appropriate processing components on board the object. Corrections of the object's position can be initiated if necessary. When we can illuminate the object for a certain length of time with a laser beam, the position of the object can be determined with respect to its direction of movement. If the object is a missile, and rotation is involved, the technique is still applicable, and the rate of rotation can be determined. When the exhaust gases of the missile cannot be penetrated by the laser light, three corner devices may be necessary on board the missile. They should be placed 120° apart, as far away as possible from the missile axis. When the missile rolls, at least one corner should always be outside the region of gases. In case B, the invention will serve the following purposes:
  (a) Alignment of remote objects.
  (b) Communication—position and movement of friendly vehicles and objects, directional message and coded commands.
  (c) Controlled landing of airplanes etc.
  (d) Guidance of vehicles, airplanes etc., moving on the ground, at night, or in adverse weather conditions (fog, smoke).
  (e) Device for the measurement of atmospheric turbulence along certain propagation paths, measuring in both directions simultaneously. Angle of arrival fluctuation meter.
  (f) Rescue mission, etc.

For this purpose corner reflectors have been used as retroreflectors for radar radiation since WW II. It is still a big problem to find a small boat in a rough sea, or persons lost in wilderness and in the mountains, etc. When a helicopter, for example, is equipped with the device under consideration here, and the people in need have a small laser, the rescue action could be made more effective.

SUMMARY OF THE INVENTION

Apparatus for determination of the vertical and horizontal aspect angles of radiation received from a remote laser transmitter. The apparatus includes a triangular cube corner reflector, with built-in detector arrays, and electronic processor. The detectors are linear arrays along the three edges of the entrance aperture. The electronic processor is located external to and behind the corner reflector. The apparatus utilizes unique optical properties, which only the trihedral triangular corner reflector has, among the various kinds of retroreflectors. The corner reflector serves as the receiver of radiation. The device measures instantaneously the horizontal and vertical aspect angles of radiation received from a remote laser transmitter.

DESCRIPTION OF THE INVENTION

Figure 1:
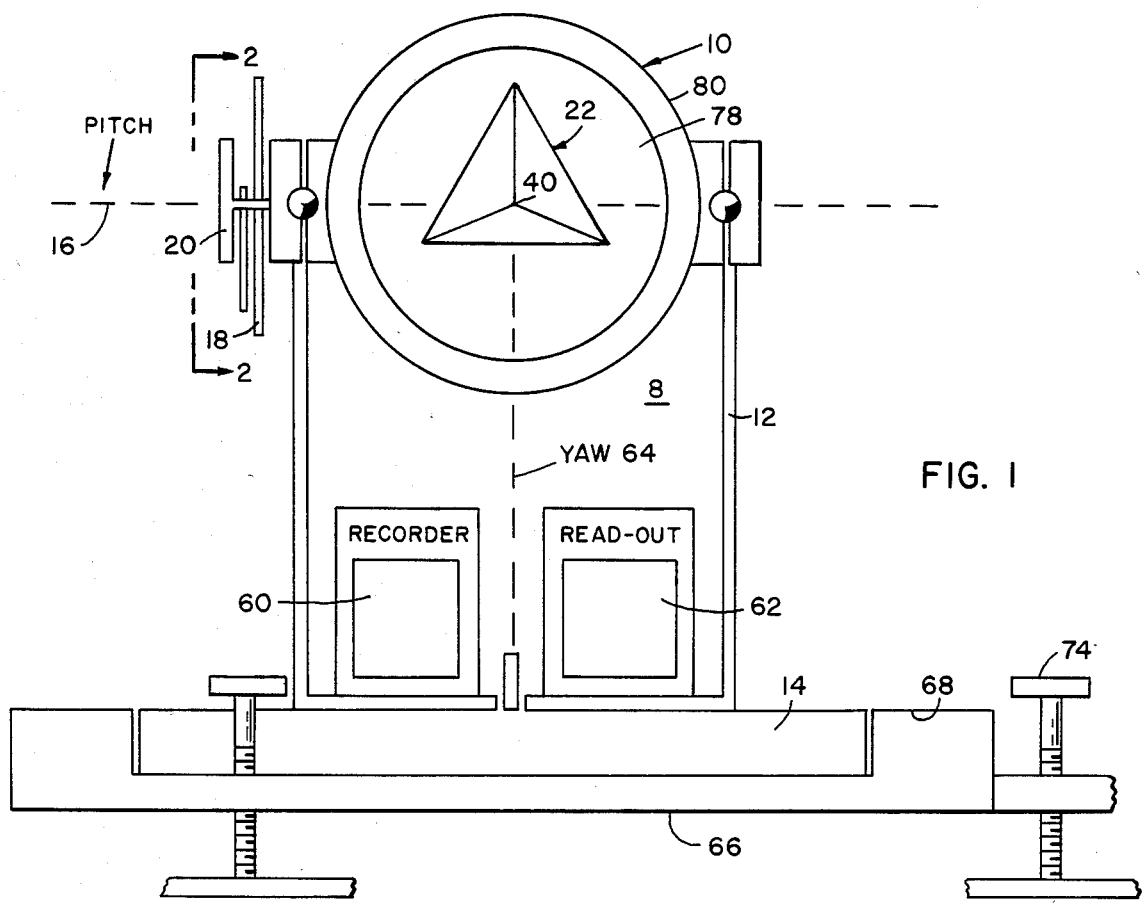
FIG. 1 is a front elevational view of the housing enclosing the angle of arrival meter and showing the triangular corner reflector, U-shaped holder, and circular platform, with support platform.
Figure 2:
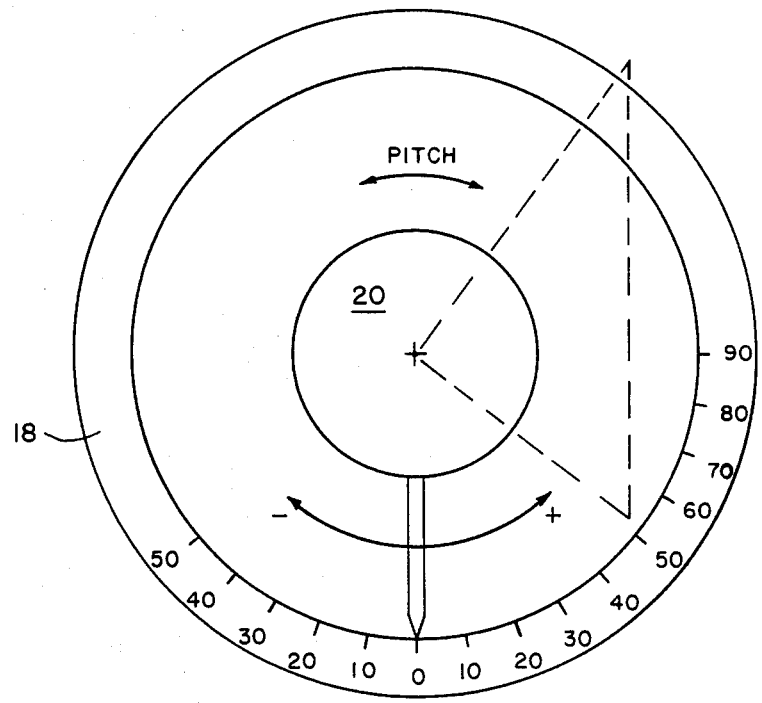
FIG. 2 is an elevational side view taken along line 2—2 of FIG. 1 of the angle of arrival meter.

Referring to the drawing, the angle of arrival meter 8 inludes a housing 10 (FIG. 1) of cylindrical shape, which is mounted through a U-shaped holder 12 on a circular platform 14. The housing 10 can be tilted in the vertical plane around an axis (pitch) 16 from −45° downward to 90° upward 18 (FIG. 2).

Figure 3:
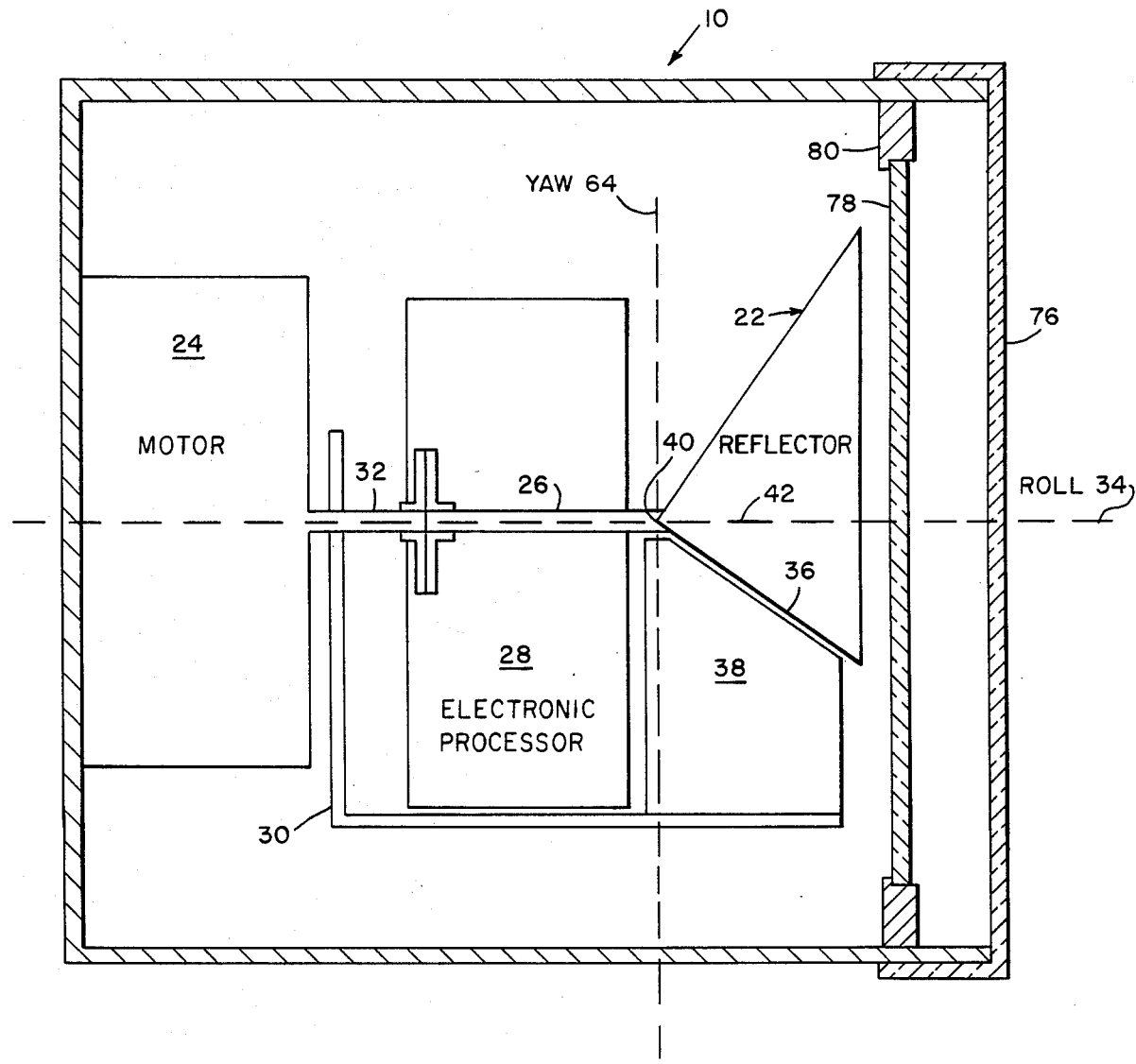
FIG. 3 is a cross section side view of the angle of arrival meter, showing the principal components therein.

Tilting of the housing 10 can be performed by a calibrated hand wheel 20 (FIG. 2) secured to housing 10, or with a drive. Inside the circular shaped cylinder 10 (FIG. 3) are the principal parts of the invention. A triangular corner reflector 22, a synchronous motor 24 with an extended shaft 26, to which the corner reflector 22, the electronic processor 28, and a supporting platform 30 is attached. The motor 24 is mounted to the closed end of the housing 10 such that the motor drive shaft 32 coincides with the cylinder axis (roll) 34. One outside wall 36 of the corner 22 sits on a special shaped stand 38, to provide proper position of the corner's apex 40 on the axis of rotation 34. The stand 38 is fastened to the support platform 30. With this arrangement the corner's perpendicular 42, which is the corner's axis of symmetry is well aligned to the axis of rotation 34 of the motor 24.

Figure 4:
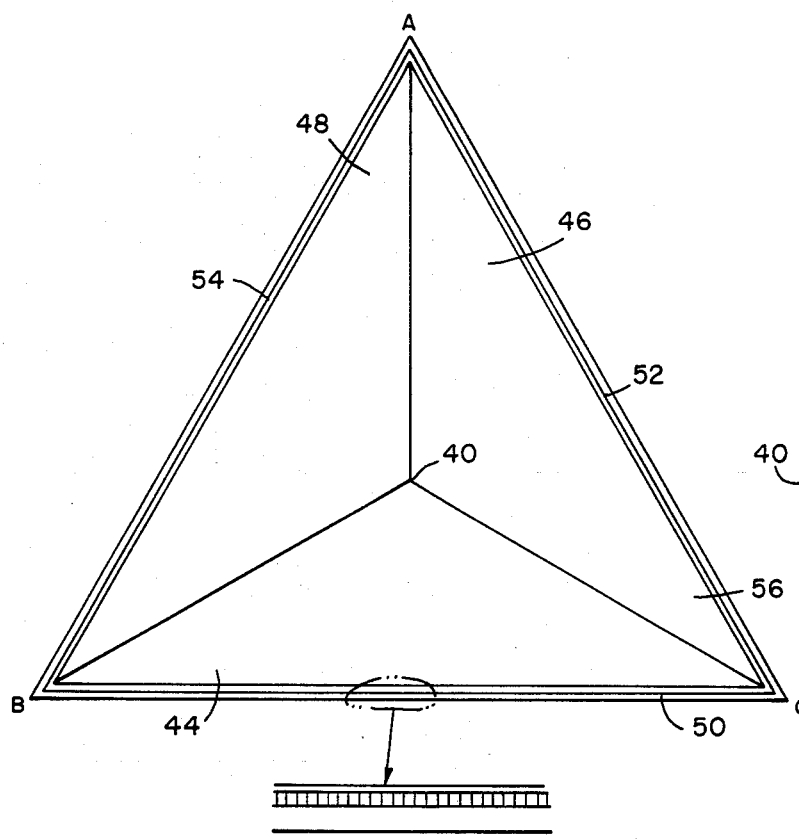
FIG. 4 is a pictorial view of the corner reflector with the apex away from the observer, and showing the backside of the three detector arrays positioned on the edges of the reflector. Below one detector in front view.
Figure 5:
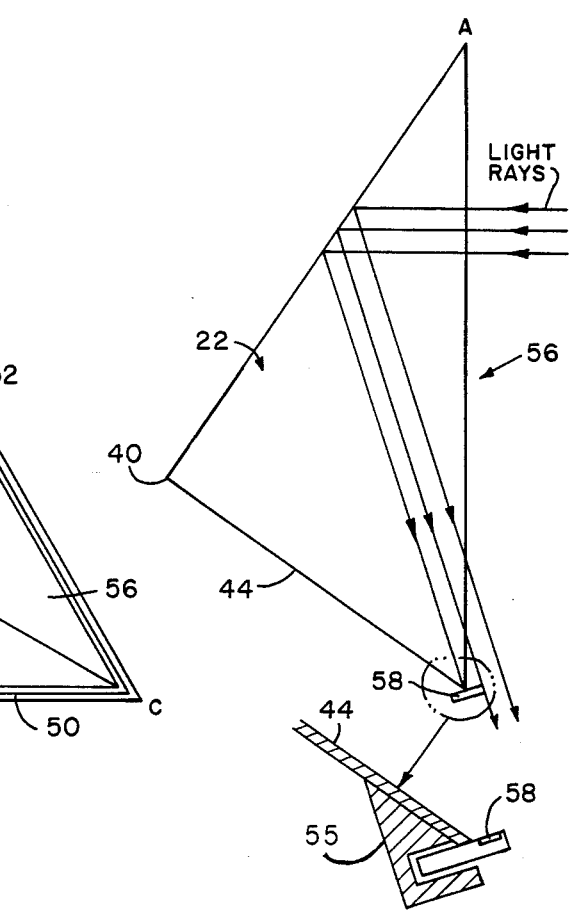
FIG. 5 is a side view of the corner reflector of FIG. 4 indicating the position of the detector array on the corner's base-line BC and the mounting of the detectors in a bracket.
Figure 6:
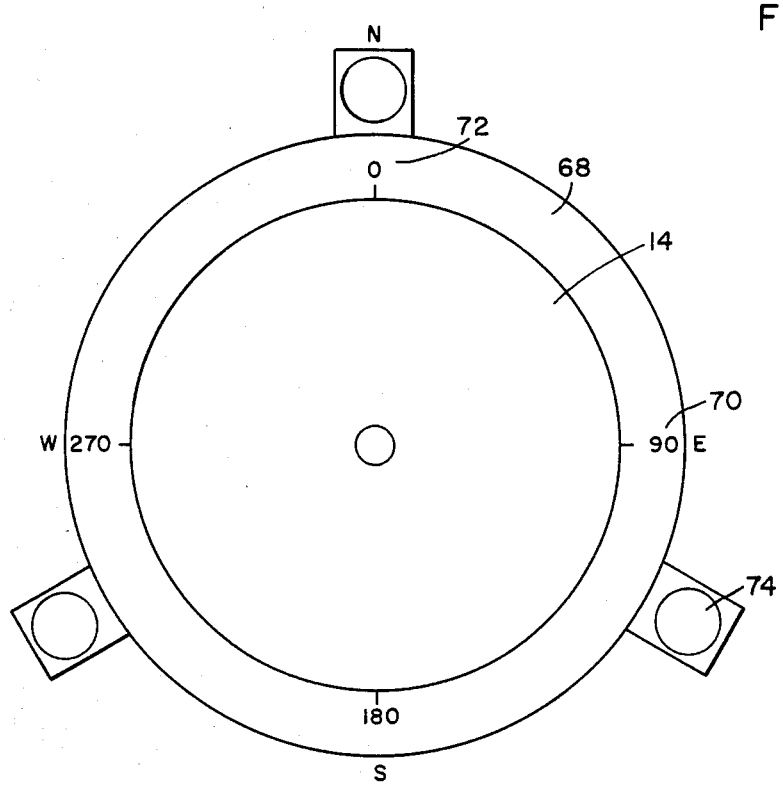
FIG. 6 is a top view of the base with the azimuth ring.
Figure 7:
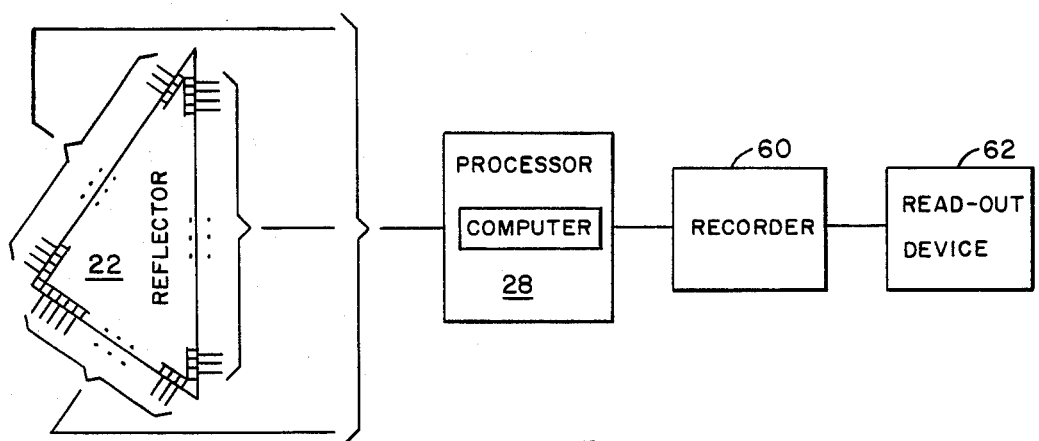
FIG. 7 is a block diagram illustrating the connection between the processor and detectors. Some detectors have been deleted for clarity.

The corner 22 is a triangular trihedral retroreflector, built from three perpendicular mirrors 44, 46, 48 (FIG. 4). FIG. 4 illustrates the apex 40 away from the observer. These mirrors are first quality mirrors and are coated with high reflecting substrates. Three linear detector arrays 50, 52 and 54 are mounted in a bracket 55 secured to the edges of the corner's aperture 56, and face the inside of the corner reflector 22 (FIG. 5) so as not to receive direct radiation. The detectors may be slideably or rigidly secured in bracket 55. The detectors are sensitive to radiation. These detectors 58 are connected to the processor 28 (FIG. 7). The electronic processor 28 is placed on the support platform 30, which is fixed to the motor shaft 32 and its extension 26. Therefore, processor 28 and corner reflector 22 will remain in an unchanged position, when in rotation. From the electronic processor 28, the measured data will be transmitted to a recorder 60 (FIG. 1) and a read-out instrument 62, which are placed on the platform 14. The U-shaped holder 12 is fastened to the platform 14 in such a way, that the apex 40 of the corner 22 coincides also with the vertical (yaw) axis 64 of the platform 14. Now the corner 22 can be rotated in any horizontal direction. The platform 14 is located inside a solid metal housing 66, which forms a ring 68 around the platform 14. This ring 68 is calibrated by an angular scale 70 (FIG. 6); which goes cw in azimuth from 0° to 360°. The 0° indication is positioned toward north 72. The housing 14 is properly leveled by three heavy screws 74, placed on the periphery.

On the open end of the cylindrical housing 10 (FIG. 3) a cover cap 76 protects the device against dust. Additional protection against pollution for the three high reflecting mirrors 22 is given by a plane parallel plate 78 of reasonable thickness, made from radiation transmitting material, which is placed inside a ring 80 in front of the corner, thus providing sealing against the outside.

In operation the device is oriented in the direction, from which radiation is expected. The side BC is horizontally oriented and the aperture ABC is vertically oriented. For a perfect operation the corner has to be entirely illuminated. Then the parallel light rays from the remote transmitter progagate through the front window and through the aperture ABC of the corner to the three corner mirrors. Depending on the initial direction, from where the radiation comes, rays will experience either two and three or one, two, and three reflections with the mirrors. From the twice reflected radiation the corner reflector produces either two or three light bundles of triangular cross section, which have in general different sizes. When these two or three bundles of rays, on their way out of the corner reflector pass the aperture, one side of each triangular light bundle strikes just over one corner side. It is here where rays will be intercepted by the detectors, which are mounted to the corner on each edge of the three corner sides. These activated detectors measure the energy of the radiation from the radiated detectors; one side of the beam's cross section will be determined. This happens in two ways:

(1) The processor device will measure the total output of all detectors located on one corner side and compare it with the output of one single detector, exposed to the same radiation. The ratio of the two outputs is the number of detectors illuminated. The obtained number may in most cases not be an integer.

(2) The processor device will count the number of adjacent small detectors, which receives full and partial illumination. In this case the length of the side of the triangular light bundle will be the number of detectors counted.

The information concerning how many detectors have been illuminated on each corner side, converted into length in centimeter, is forwarded to the small computer which may be in the processor inside the housing, which processes the data and finally determines the data of horizontal and vertical aspect angles. At the end of each cycle these data are submitted to a recorder and to the read-out instrument, outside the device.

The apparatus is insensible to hot spots in the radiation. Also, the usefulness of the angle of arrival meter is not limited to IR-radiation, laser radiation, and monochromatic radiation, also not to coherency. Any electromagnetic radiation, which stems from a primary or secondary source, can be utilized, if the corner reflector is equipped with appropriate detectors. Detectors are available from UV, Visible, IR to the mm-wavelength region, e.g., photo voltaic cells, thermistors, silicon CCD (charge couple devices), pyroelectric detectors, and semiconductor diodes and others. With the semiconductor diodes, the angle of arrival meter may be used up to 4 mm-wavelength, at which wavelength the device would perform the receive function of directional antennas, such as monopulse antennas. Because of the high efficiency of the semiconductor diodes, an improvement of a magnitude can be expected. A further option is to use an array of optical fibers as entrance elements for the radiation which direct the radiation to the individual detectors.

The angular range of angles the ray makes with the corner's perpendicular is asymmetrical because of the triangular shape of the corner's aperture. For this reason the opening angle of the corner is within the interval from 78.46° to 90°. A maximal symmetrical angular range for all rays, which can enter the corner and will experience three reflections, are in a circular solid cone of 70.52° diameter, where the axis is in the perpendicular, and the cone's apex coincides with the corner's apex. The diameter of the symmetrical cone of rays which can usefully be processed, which defines the range of aspect angles is estimated to be approximately 60°. An increase of the angular range can be obtained when the corner is rotated within an angular range ±120°, for which the maximum range is estimated to be approximately ±55°.

For the accuracy, with which the horizontal and vertical aspect angles can be determined, a fraction of a degree is estimated. The accuracy depends on the dimensions of the detectors and the corner. At present, it is estimated that the size of the corner reflector employed in the near infrared region can be quite small, for example on the order of 5 cm for each side. There are applications where larger sizes may be needed. In general, the reflector design is not critical as to size.

I claim:

1. Apparatus for the determination of the horizontal and vertical aspect angles of radiation received from a remote transmitter comprising:
   a. a first platform;
   b. a movable housing mounted on said first platform;
   c. a triangular cube corner reflector mounted on said housing to receive radiation from said remote transmitter, said corner reflector being a triangular trihedral retroreflector having three mutually perpendicular mirror surfaces;
   d. a plurality of detectors mounted in an array adjacent each of said three mutually perpendicular mirror surfaces and facing the inside of said reflector, said detectors disposed for receiving reflected radiation from said reflector and for providing an output in response to receiving said reflected radiation;
   e. electronic processor means connected to said detector means for receiving said output from said detectors for determining the horizontal and vertical aspect angles of said received radiation by determining the number of detectors energized by said radiation reflected from said mirror surfaces.

2. Apparatus as in claim 1 wherein said housing is provided with a cylindrical configuration for housing said electronic processor and said reflector.

3. Apparatus as in claim 2 including a synchronous motor carried in said cylindrical housing, said motor having a shaft for support of said electronic processor and said reflector, said motor disposed for orienting said corner reflector in a desired position.

4. Apparatus as in claim 3 including an annular support member having said platform mounted therein, said annular support member being calibrated by an annular scale and disposed for rotation through 360 degrees.

5. Apparatus as in claim 4 including a recorder and a read-out device connected to said electronic processor.

6. Apparatus as in claim 5 including a motor mounted in said housing, and a second platform mounted on the shaft of said motor, said motor shaft also disposed for support of said reflector thereon whereby the relative position of said processor and said reflector remains unchanged.

* * * * *